US010882175B2

(12) United States Patent
Bindhammer

(10) Patent No.: US 10,882,175 B2
(45) Date of Patent: Jan. 5, 2021

(54) ELECTRIC HAMMER

(71) Applicant: Scheppach Fabrikation von Holzbearbeitungsmaschinen GmbH, Ichenhausen (DE)

(72) Inventor: Markus Bindhammer, Friedberg (DE)

(73) Assignee: Scheppach Fabrikation von Holzbearbeitungsmaschinen GmbH, Ichenhausen (DE)

(*) Notice: Subject to any disclaimer, the term of this patent is extended or adjusted under 35 U.S.C. 154(b) by 228 days.

(21) Appl. No.: 16/057,411

(22) Filed: Aug. 7, 2018

(65) Prior Publication Data
US 2019/0061131 A1   Feb. 28, 2019

(30) Foreign Application Priority Data

Aug. 24, 2017   (EP) .................................. 17020382

(51) Int. Cl.
| B25D 11/12 | (2006.01) |
| B25D 16/00 | (2006.01) |
| B25F 5/02 | (2006.01) |
| A01B 1/02 | (2006.01) |

(Continued)

(52) U.S. Cl.
CPC ............ B25D 16/006 (2013.01); A01B 1/026 (2013.01); B25D 11/12 (2013.01); B25D 11/125 (2013.01); B25D 17/02 (2013.01); B25D 17/04 (2013.01); B25F 5/02 (2013.01); *B25D 2211/068* (2013.01); *B25D 2216/0084* (2013.01); *B25D 2250/095* (2013.01); *B25D 2250/265* (2013.01); *B25D 2250/331* (2013.01)

(58) Field of Classification Search
USPC ........................................................ 173/170
See application file for complete search history.

(56) References Cited

U.S. PATENT DOCUMENTS 3,952,239 A * 4/1976 Owings .................... B25F 3/00
                                                           320/113
6,112,831 A * 9/2000 Gustafsson .......... B25D 17/043
                                                           173/162.2
6,128,979 A   10/2000 Shepherd
(Continued)

FOREIGN PATENT DOCUMENTS

DE   10 2005 024 586 A1   7/2006
EP      2 253 430 A1   11/2010

*Primary Examiner* — Michelle Lopez
*Assistant Examiner* — Chinyere J Rushing-Tucker
(74) *Attorney, Agent, or Firm* — Falk Ewers; Ewers IP Law PLLC

(57) ABSTRACT

A hand-held electric hammer includes a handle arrangement on a tool carrier shank in which a striking mechanism actuated by an electric motor is accommodated and at the lower end of which a tool holder is arranged, which is suitable for receiving a tool attachment in the form of a spade blade, a demolition chisel, or a PVC scraper. The handle arrangement is designed as a T-shaped T-handle seated on the tool carrier shank, so that on both sides of the tool carrier shank there are two handles for both a left and a right hand of a user, whereby in the lower half of the tool carrier shank an additional handle stub is attached protruding in parallel with the T-handle from the tool carrier shank, which allows the electric hammer to be gripped with one hand on the T-handle and with the other hand on the additional handle stub.

14 Claims, 5 Drawing Sheets

(51) Int. Cl.
  *B25D 17/02* (2006.01)
  *B25D 17/04* (2006.01)

(56) References Cited

U.S. PATENT DOCUMENTS

| | | | |
|---|---|---|---|
| 8,522,895 B1* | 9/2013 | Honsa | B25D 17/046 |
| | | | 173/169 |
| 8,544,910 B1* | 10/2013 | Weist | A01B 1/22 |
| | | | 294/49 |
| 8,955,612 B2* | 2/2015 | O'Toole | E02D 7/00 |
| | | | 173/90 |
| 9,463,566 B2* | 10/2016 | Yoshikane | B25F 5/02 |
| 2012/0103644 A1 | 5/2012 | Walsh et al. | |
| 2014/0116737 A1* | 5/2014 | Iwata | B25F 5/001 |
| | | | 173/20 |
| 2014/0131059 A1* | 5/2014 | Verbrugge | B25F 5/02 |
| | | | 173/217 |
| 2015/0264853 A1 | 9/2015 | Anthony et al. | |
| 2015/0298309 A1* | 10/2015 | Berdin | B25D 9/10 |
| | | | 173/46 |
| 2016/0311094 A1* | 10/2016 | Mergener | B25F 5/00 |
| 2018/0009098 A1* | 1/2018 | Nagasaka | B25F 5/026 |
| 2018/0303493 A1* | 10/2018 | Chapolini | A61B 17/1622 |

\* cited by examiner

ELECTRIC HAMMER

CROSS REFERENCE TO RELATED APPLICATIONS

This application claims priority to European patent application No. EP 17 020 382.2, filed Aug. 24, 2017, the entire content of which is incorporated herein by reference.

TECHNICAL FIELD

The invention relates to an electric hammer.

BACKGROUND

So-called compressed air spades are state of the art, see for example German patent application DE 10 2005 024 586 A1. They facilitate excavation work in inaccessible places and hard soils. These are pneumatic hammers with an air-operated percussion mechanism which acts on a spade blade.

For operation, such compressed air spades require a compressor with the appropriate tank capacity to provide the necessary amount of air. This severely restricts the mobile use of a compressed air spade, especially in the garden area. A power source for the compressor must also be available. For longer distances, the location of the compressor must be adjusted, whereby the rigid compressed air hose, through which compressed air is supplied to the compressed air spade and which must have a sufficient diameter, further restricts mobility because it constantly gets stuck somewhere in the garden or on construction sites.

Further approaches to simplify excavation work are based on a spring-actuated impact tool with spade attachment, see US 2012/0103644 A1, whereby the tool holder for the spade attachment is provided with SDS coupling, so that different tools, such as spades or breakage tools can be placed on the spade handle.

However, the trend is towards electromotive spades. For example, U.S. Pat. No. 6,128,979 already shows a blade specially designed for removing roof tiles, on the one hand with compressed air drive and on the other hand with electric motor drive. A rod provided with a piston is driven via the motor drive shaft and an intermediate gearwheel, which acts on a damper of an impact mechanism. In addition to the bucket attachment, a chisel attachment is also shown there, with which the tool can be used for an additional purpose.

US 2015/0264853 A1 shows and describes a battery-operated spade, whereby the use of lithium ion batteries is mentioned here.

U.S. Pat. No. 8,544,910 B1 shows and describes a battery-powered spade, in which a battery pack is arranged in the spade shaft, which supplies electrical energy to an electric motor also arranged in the spade shaft and can be charged via a charging connection. An ON-OFF switch is provided for operation. The motor axle then drives, via an intermediate gear wheel, an axle eccentrically articulated to it and connected to a connecting rod, whereby the connecting rod hits on the underside of a square bolt of an exchangeable blade inserted into the shaft. Different blades can be provided.

While such electric hammers with a spade attachment generally simplify excavation work, their handling is still in need of improvement. Especially if, in addition to digging tool attachments, other tool attachments such as chisels or scraper plates are to be used with the electric hammer to carry out other work in addition to excavation work, such as demolition work or the removal of carpets, PVC floors, wallpaper or insulation boards.

European patent application EP 2 253 430 A1 describes an electric hammer, which has a T-shaped T-handle on the tool carrier shank end, so that on both sides of the tool carrier shank end there are two handles for both a left and a right hand of a user to guide the spade safely. Further, the electric hammer has an additional handle stub in the lower third of the tool carrier shaft, which allows the electric hammer to be gripped with one hand by the T-handle and with the other hand by the additional handle stub, thus enabling the electric hammer to be handled in a manner like a drilling machine.

SUMMARY

It is therefore an object of the present invention to improve the handling of an electric hammer of the above type for various purposes.

This object is achieved by a hand-held electric hammer as disclosed herein.

The electric hammer has a striking mechanism operated by an electric motor, which is housed in a tool carrier shank. On the one hand, there is a T-handle situated on the tool carrier shank in a T-shape. On the other hand, in the lower half, typically in the lower third of the tool carrier shank, an additional handle stub is attached to the tool carrier shank, which projects from the tool carrier shank, in particular in parallel to the T-handle. The additional handle stub allows the electric hammer to be gripped with one hand by the T-handle and with the other hand by the additional handle stub, thus enabling the electric hammer to be handled like a drilling machine when excavating in hard ground or during demolition or scraping work, especially on resistant walls or well-bonded PVC sheets or when used overhead. The range of application of the electric hammer is thus considerably extended compared to an electric hammer designed purely as a battery-powered spade.

According to an aspect of the invention, the electric motor for driving the striking mechanism housed in the tool carrier shaft is arranged in the additional handle stub.

Advantages result with regard to an accumulator unit arranged in the advantageously hollow tool carrier shank and with regard to the drive train for the striking mechanism of the electric hammer. On the one hand, there is more space for the accumulator unit in the tubular tool carrier shank. This can then be dimensioned accordingly larger so that the electric hammer lasts long even at high impact power before it has to be charged. In addition, the arrangement of the motor in the additional handle stub, which preferably protrudes vertically from the tool carrier shank, makes angular gears or similar intermediate stages or transmission units superfluous. The motor output shaft can rather be designed as a crankshaft projecting directly into the tool carrier shaft, on which a reciprocating connecting rod, which is connection with the striking mechanism, is mounted within the tool carrier shaft. This results in further space, cost and weight advantages, whereby the installation space gained is in turn available for an increase in the accumulator unit, which can further increase the endurance of the electric hammer until the next charge.

If the electric motor serving as the drive unit is designed as a brushless DC motor, the additional handle stub is not too large, as these DC motors are characterized by excellent torque at compact design. In addition, brushless DC motors are virtually maintenance-free and electronically very easy to control. The additional handle stub can be provided with ventilation openings, so that the motor heat can be better dissipated.

The accumulator unit typically consists of a composite of lithium-ion cells or a lithium-polymer unit to ensure the highest possible energy density, so that the endurance of the electric hammer is further increased until the next charge.

The electric hammer is thus advantageously designed for use as a battery-operated spade.

At least one switch can be provided, via which the electric hammer can not only be switched on and off, but can also be set to different operating modes. For example, if the switch is operated briefly once, the speed and thus the number of strokes is automatically set for excavation work, if the switch is operated briefly twice in succession, the number of strokes is optimally designed for demolition work, if it is operated briefly three times in succession, the number of strokes is optimally configured for scraping work. Furthermore, both handles are typically equipped with an electric or electronic switch, so that the spade can be operated comfortably by a left or right hander. A switch can also be provided on the additional handle stub so that convenient operation is also possible when the electric hammer is held like a drilling-machine.

If a cover is provided for the T-shaped connection of the tool carrier shaft with the two handles, for example in the form of a fork or bifurcation block from which the two handles protrude, typically screwed to it, this simplifies the assembly of the electric hammer because the inside of the tool carrier shaft is easily accessible. In addition, the accumulator unit can be replaced or removed for charging in the event of a failure.

However, in order to further improve operating convenience, it is typical to have a charging socket for the accumulator unit located in the tool holder, so that the accumulator unit can be charged without removal. The charging socket can be covered with a rubber cap or similar to protect it against dust and splash water.

In particular if a circuit board carrying the control hardware is arranged in the bifurcation block, one of the two free ends of the T-handle is suitable for mounting the charging socket, resulting in short cable runs.

To further facilitate its handling, the electric hammer can also be equipped with a display, in particular an LCD or OLED display, to indicate the charge level of the accumulator unit, the remaining running time under current load and/or other parameters. The display device can be mounted on the top of the bifurcation block where it is easy to read. In addition, there is a short cable duct to the control board in the tool carrier shank or in the bifurcation block.

For the control of the electric hammer, a control unit is advantageously provided, which is arranged inside the electric hammer to protect it from moisture or shocks. The control unit advantageously has control hardware and control software running on it, whereby the control hardware sits on a circuit board and includes one or more microcontrollers. If the circuit board is located above the accumulator unit in the tool carrier shank or in the bifurcation block, short cable paths result, as already explained. The control unit can control the electric motor, for example, in response to the settings made via the switches, the accumulator unit in response to an energy take-off by the electric motor or an energy supply via the charging socket and/or the display device in response to a charge state transmitter which determines the charge state of the accumulator unit.

If the tool holder has an SDS drill shank system, as is usual for striking and rotating power tools, many common tool attachments available on the market are compatible with the electric hammer.

BRIEF DESCRIPTION OF THE DRAWINGS

The invention will now be described with reference to the drawings wherein.

DESCRIPTION OF EXEMPLARY EMBODIMENTS

Figure 1:
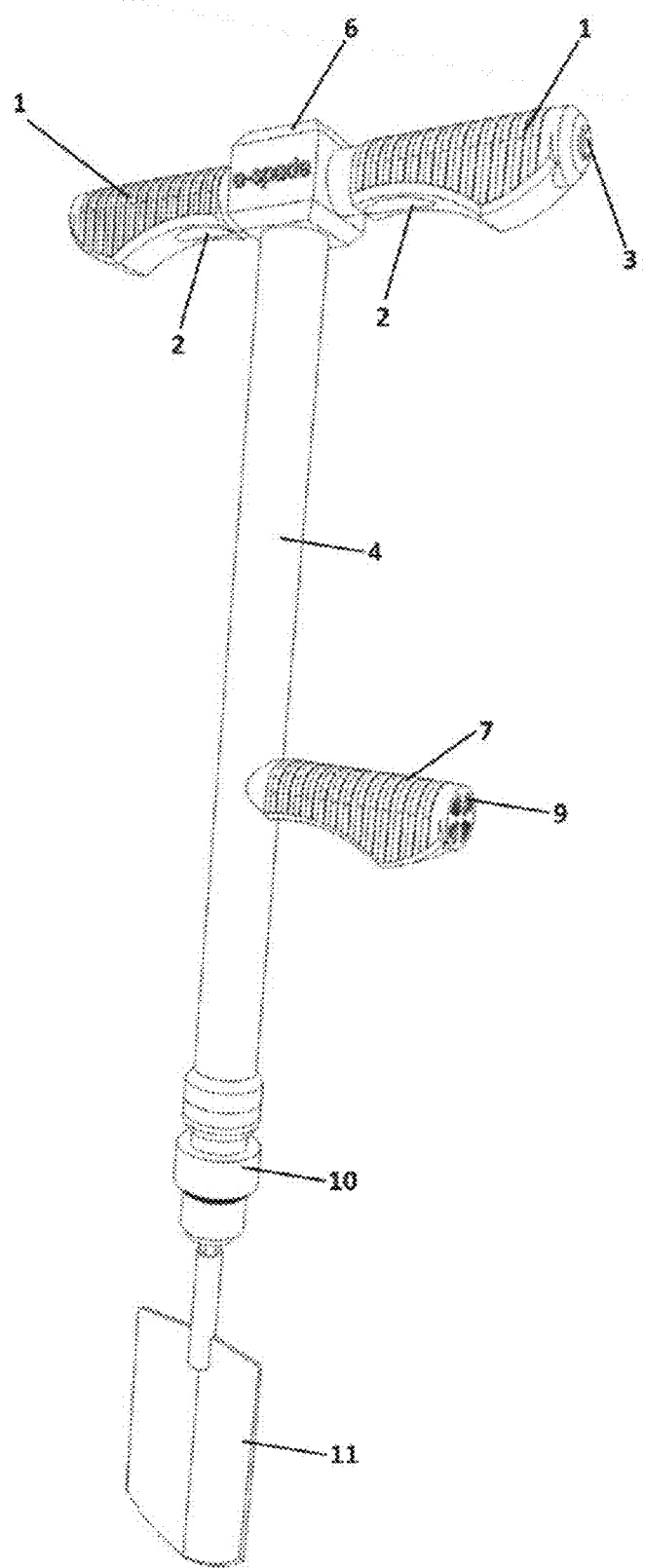
FIG. 1 is a perspective view of an electric hammer according to an exemplary embodiment of the invention.

FIG. 1 shows the general construction of an electric hammer designed as a battery-operated spade according to an exemplary embodiment of the invention. In the upper area, the spade has a T-handle attached to its tool carrier shank in a T-shape. The T-handle consists of a bifurcation block 6, typically screwed onto the tool carrier shank 4, from which a handle 1 protrudes to the left and right.

Both handles 1 are equipped with an electric or electronic switch 2. The switches 2 serve not only as on-off switches, but also for configuring the spade. For example, if one of the switches 2 is pressed once briefly, the speed and thus the number of strokes is set automatically optimised for excavation work. If the switch 2 is pressed twice in short succession, the number of strokes is optimally designed for demolition work. If it is pressed three times in short succession, the number of strokes is optimally configured for scraping work. The other switch 2 can then serve as an ON-OFF switch. It would also be conceivable to design both switches as ON-OFF switches and as configuration switches, so that the spade can be conveniently operated by both left-handed and right-handed users. A watchdog or dead man's switch would also be possible.

At the end of the left or right handle 1 is a charging socket 3 for battery cells of an accumulator unit or an accumulator 5 located in the tool holder or main tube 4. The charging socket 3 is equipped with a rubber cap to protect against dust and splash water. Bifurcation block 6 may have a display device 18, e.g., an LCD or OLED display or other indicator on the top to indicate the charge level of battery 5 or the remaining battery life under current load or other parameters.

In the lower third of the tool carrier shank 4, an additional handle stub 7 is attached. To ensure the necessary heat dissipation, the end of the additional handle stub 7 is provided with ventilation openings 9.

At the lower end of the tool carrier shank 4, there is a tool holder 10, in which a tool attachment designed as a spade blade 11 is inserted. However, another tool attachment can also be fixed there, e.g. a tool attachment designed as a demolition chisel or PVC scraper, as long as it fits into the tool holder. The tool holder 10 can be designed hexagonally or equipped with the usual SDS drill shank system for striking and rotating power tools.

Figure 2:
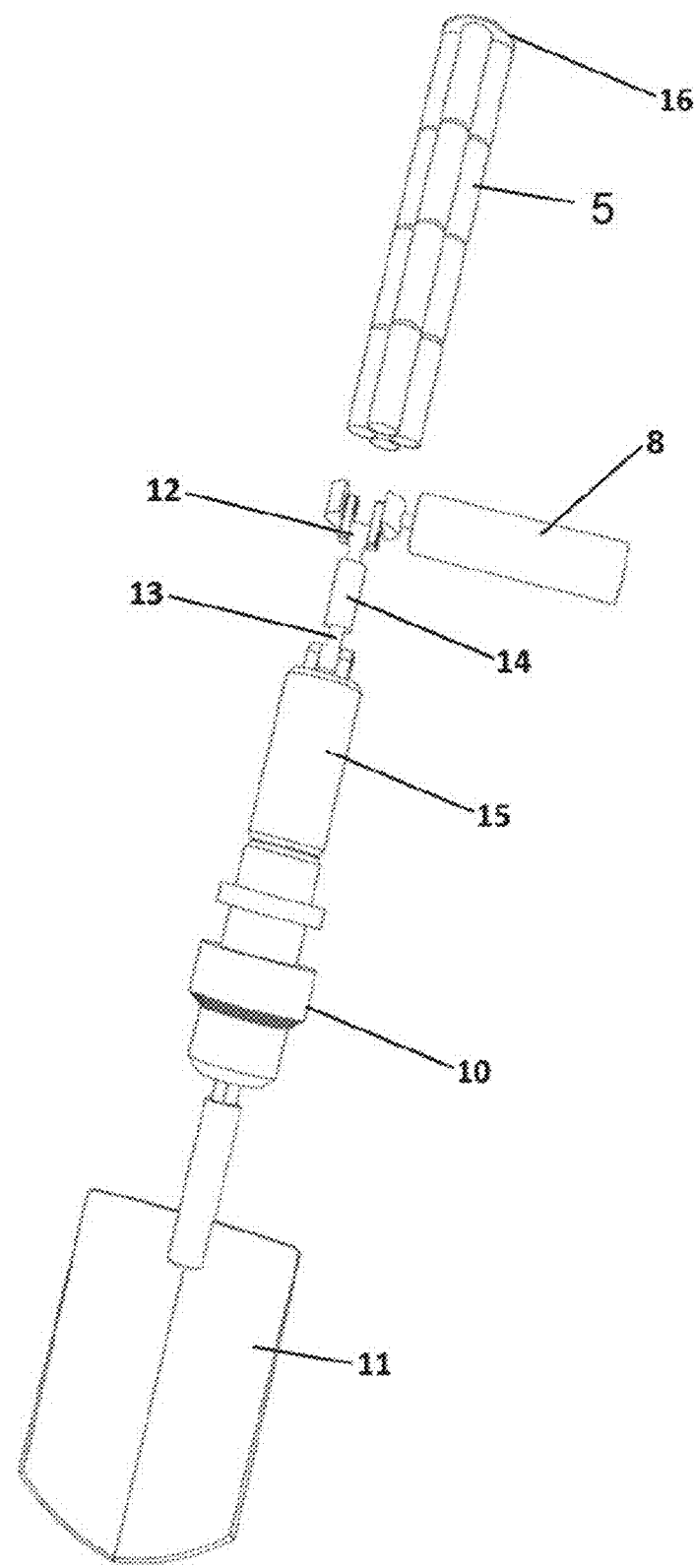
FIG. 2 is a view largely corresponding to FIG. 1, omitting the tool carrier shank, the T-handle and the additional handle connecting piece.

FIG. 2 shows the main internal components of the battery-operated spade. The accumulator unit 5 can be designed as a battery pack with, for example, 4×4 conventional lithium-ion round cells. Conventional lithium-ion round cells are relatively inexpensive. An electric motor 8 serving as a drive unit can be designed as a brushless DC motor. If, on the other hand, an ordinary DC motor is used for cost reasons, it can be equipped with an optical, Hall effect or magneto-resistive rotary transmitter in order to continuously measure the current speed and adjust it if necessary.

The electric motor 8 can directly drive an eccentric 12, namely a motor output shaft designed as a crankshaft, in order to convert the rotary movement into a longitudinal movement. The two axes of the U-shaped crankshaft, namely the eccentric 12, one of which represents the motor axis and the other a bearing axis for a connecting rod 13, can each have ball bearings.

The connecting rod 13 is advantageously equipped with a shock absorber 14 to prevent damage. The connecting rod 13 is connected to striking mechanism 15. This exerts the necessary impulse on the tool holder 10, which is movably mounted.

Figure 3:
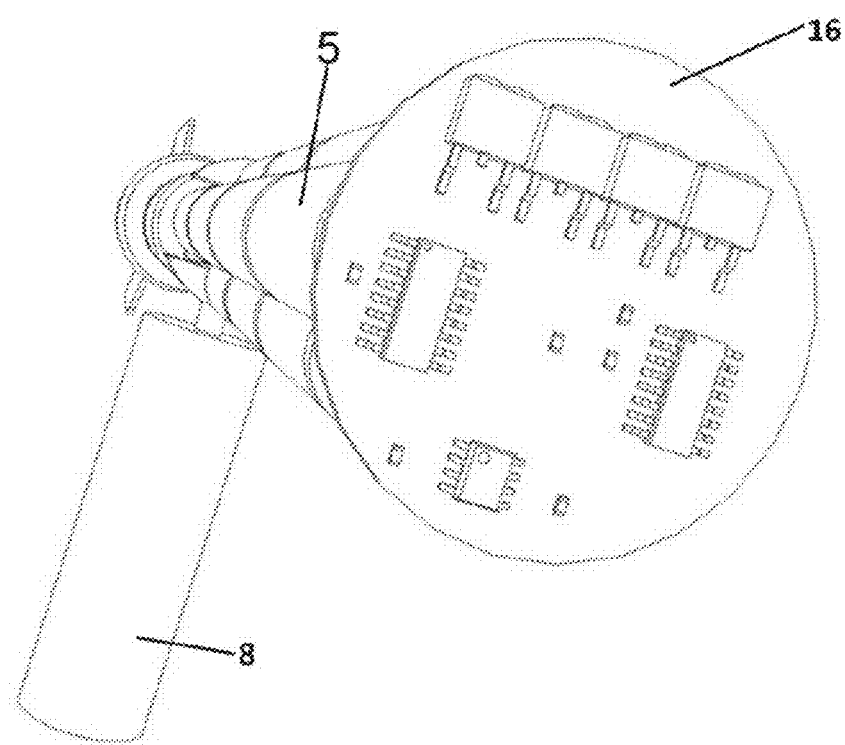
FIG. 3 is a view from above, omitting the tool carrier shank, the T-handle and the additional handle socket, on the electric hammer shown in the previous figures.

The entire control of the battery-operated spade is taken over by one or more microcontrollers forming part of a control unit 19. The control unit 19 is mounted on a board 16 above the battery 5, as shown in FIG. 3, wherein there is also a charge tate sensor 20 provided on the board 16, determining the charge state of the accumulator unit 5. The circuit board 16 is located in the bifurcation block 6, so that there is enough space for the cabling.

Figure 4:
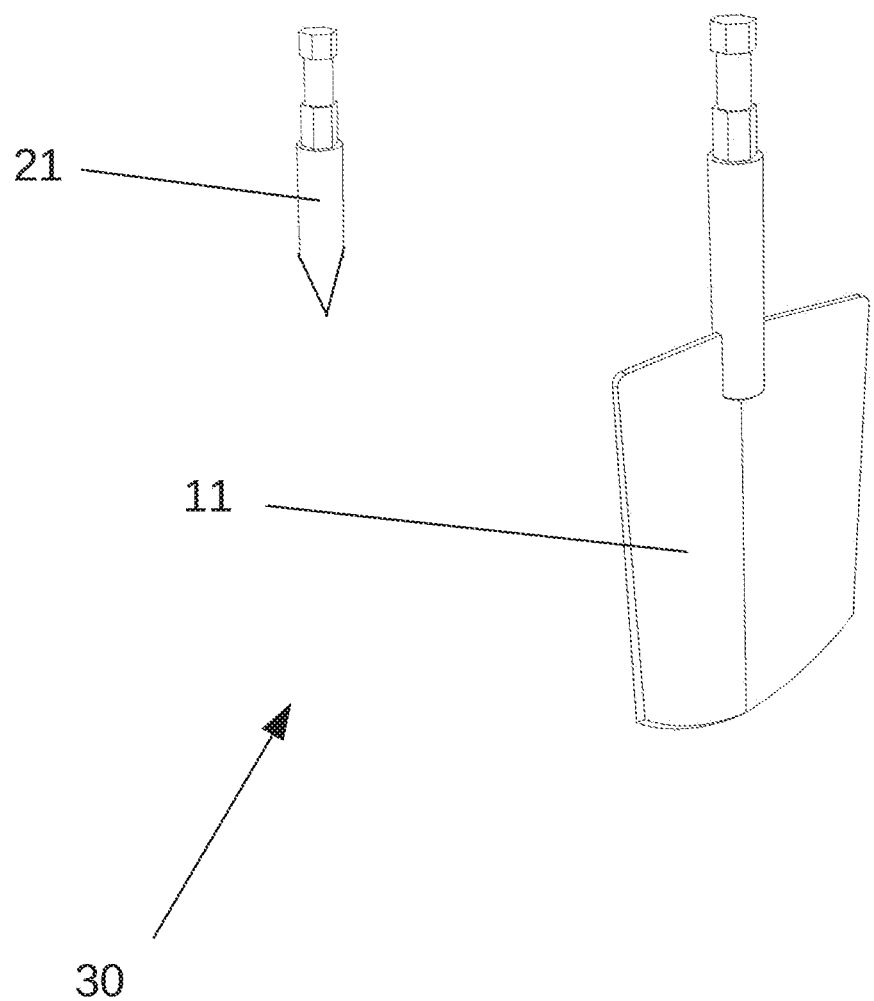
FIG. 4 shows a set of different tool attachments for the electric hammer shown in FIG. 1.
Figure 5:
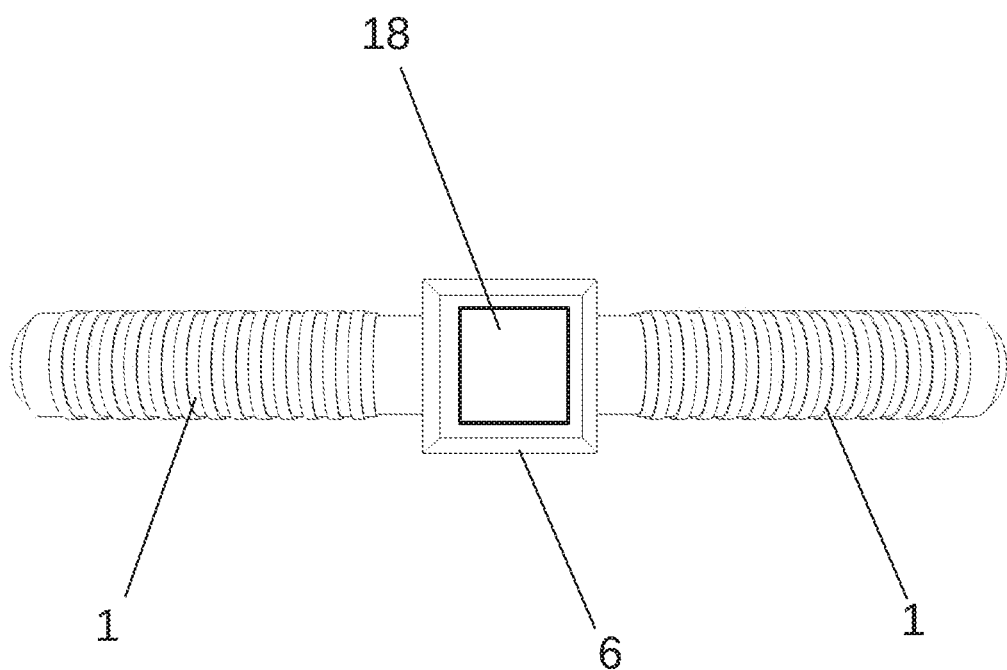
FIG. 5 shows a top view of the electric hammer shown in FIG. 1.

FIG. 4 shows a set 30 of tool attachments containing the attachment formed as a spade blade 11 and another tool attachment, here formed as a demolition chisel 21.

It is understood that the foregoing description is that of the exemplary embodiments of the invention and that various changes and modifications may be made thereto without departing from the spirit and scope of the invention as defined in the appended claims.

What is claimed is:

1. A hand-held electric hammer comprising:
a handle arrangement on a tool carrier shank in which a striking mechanism actuated by an electric motor is accommodated and at a lower end of which a tool holder is arranged, which is suitable for receiving a tool attachment designed as a spade blade and for receiving at least one further tool attachment,
wherein the handle arrangement is designed as a T-shaped T-handle seated on the tool carrier shank, so that two handles for both a left and a right hand of a user are provided on both sides of the tool carrier shank,
wherein an additional handle stub being attached to the tool carrier shank in a lower half which permits the electric hammer to be gripped with one hand on the T-handle and with the other hand on the additional handle stub, and
wherein the additional handle stub houses the electric motor.

2. The electric hammer according to claim 1, wherein the electric hammer comprises a set of tool attachments containing the tool attachment formed as a spade blade and at least one further tool attachment.

3. The electric hammer according to claim 1, wherein an accumulator unit serving to operate the electric hammer is accommodated in the tool shank.

4. The electric hammer according to claim 1, wherein the electric hammer is designed for use as a battery-powered spade.

5. The electric hammer according to claim 1, wherein the additional handle stub is provided with ventilation openings at its free end.

6. The electric hammer according to claim 1, wherein the electric motor has an output shaft designed as a crankshaft which projects into the tool carrier shank and on whose crank axis extending eccentrically to the motor axis a connecting rod is received in a rotationally movable, which connecting rod is connected to the striking mechanism.

7. The electric hammer according to claim 1, wherein the striking mechanism acts on the tool holder, which is movably mounted on the tool carrier shank.

8. The electric hammer according to claim 1, wherein the accumulator unit consists of several lithium-ion cells or of a lithium-polymer unit.

9. The electric hammer according to claim 1, wherein for the T-shaped connection of the tool carrier shank with the two handles, a bifurcation block is provided which rests on the tool carrier shank and from which the two handles project.

10. The electric hammer according to claim 1, wherein the two handles are each equipped with an electric or electronic switch, which switches are configured for switching on/off and for setting the mode of operation of the electric hammer as a spade or another tool.

11. The electric hammer according to claim 1, wherein a charging socket for the accumulator unit located in the tool carrier shank is arranged at the free end of the left or right handle.

12. The electric hammer according to claim 1, wherein the electric hammer has a display device for indicating the charge level of the accumulator unit, the remaining running time under current load and/or other parameters.

13. The electric hammer according to claim 1, wherein for controlling the electric hammer in response to a charge state sensor determining the charge state of the accumulator unit, a control unit is provided, which is arranged inside the electric hammer above the accumulator unit.

14. The electric hammer according to claim 1, wherein the tool holder has an SDS drilling shaft system.

* * * * *